US011597428B2

(12) United States Patent
Arlt et al.

(10) Patent No.: US 11,597,428 B2
(45) Date of Patent: Mar. 7, 2023

(54) INDEXING GEAR MECHANICAL STOP

(71) Applicant: Steering Solutions IP Holding Corporation, Saginaw, MI (US)

(72) Inventors: George E. Arlt, Midland, MI (US); Joel A. Bickel, Millington, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 183 days.

(21) Appl. No.: 17/071,703

(22) Filed: Oct. 15, 2020

(65) Prior Publication Data

US 2021/0139068 A1 May 13, 2021

Related U.S. Application Data

(60) Provisional application No. 62/934,359, filed on Nov. 12, 2019.

(51) Int. Cl.
*B62D 5/00* (2006.01)
*B62D 3/02* (2006.01)
*F16H 35/00* (2006.01)

(52) U.S. Cl.
CPC .............. *B62D 5/001* (2013.01); *B62D 3/02* (2013.01); *F16H 35/00* (2013.01); *F16H 2035/006* (2013.01)

(58) Field of Classification Search
CPC .... F16H 2035/006; F16H 35/00; F16H 27/08; F16H 2019/008; B62D 3/02; B62D 5/001; F16K 31/535
USPC .................................................. 74/820, 435
See application file for complete search history.

(56) References Cited

U.S. PATENT DOCUMENTS

| | | | | |
|---|---|---|---|---|
| 290,299 A | * | 12/1883 | White | F16H 27/08 74/435 |
| 3,650,156 A | * | 3/1972 | Thomas | G05G 5/04 74/436 |
| 3,777,591 A | * | 12/1973 | Thomasian | G05G 5/04 192/139 |
| 3,817,116 A | | 6/1974 | Georgieff | |

(Continued)

FOREIGN PATENT DOCUMENTS

| | | |
|---|---|---|
| CN | 101428639 A | 5/2009 |
| CN | 105042993 A | 11/2015 |

(Continued)

OTHER PUBLICATIONS

English translation of First Office Action regarding corresponding CN App. No. 202011261449.5; dated Jul. 27, 2022.

(Continued)

*Primary Examiner* — Jake Cook
(74) *Attorney, Agent, or Firm* — Dickinson Wright PLLC

(57) ABSTRACT

A hand-wheel actuator for preventing over rotation of a hand-wheel shaft. The hand-wheel actuator comprises a housing that defines an opening aligned about an axis. The hand-wheel shaft extends along and is rotatable about the axis. A drive gear is rotationally coupled to the hand-wheel shaft, wherein the drive gear is at least partially disposed in the opening and includes a drive gear tooth. A stop gear is coupled to the housing and includes a plurality of stop gear teeth for engagement with the drive gear tooth and prevents rotation of the drive gear over a predetermined threshold.

11 Claims, 7 Drawing Sheets

(56) References Cited

U.S. PATENT DOCUMENTS

| | | | | | |
|---|---|---|---|---|---|
| 4,609,841 | A | * | 9/1986 | Masaki | F16H 35/00 |
| | | | | | 310/83 |
| 4,641,544 | A | * | 2/1987 | Russ | E05F 15/611 |
| | | | | | 74/435 |
| 4,821,975 | A | * | 4/1989 | Uetsuki | A01K 89/0155 |
| | | | | | 74/435 |
| 5,816,523 | A | * | 10/1998 | Hori | B60R 22/48 |
| | | | | | 242/385.1 |
| 2018/0238448 | A1 | * | 8/2018 | Gausrab | F16H 19/001 |
| 2019/0092375 | A1 | | 3/2019 | Bodtker et al. | |

FOREIGN PATENT DOCUMENTS

| | | | | | |
|---|---|---|---|---|---|
| CN | 107953925 | A | | 4/2018 | |
| DE | 102014200844 | A1 | * | 7/2015 | F01P 7/14 |
| EP | 1009088 | A2 | * | 6/2000 | F16H 19/001 |
| JP | 10194152 | A | | 7/1998 | |
| JP | 2004189037 | A | | 7/2004 | |
| KR | 1020040108000 | A | | 12/2004 | |
| KR | 100503324 | B1 | * | 7/2005 | B62D 5/001 |

OTHER PUBLICATIONS

English translation of Office Action regarding corresponding DE App. No 10 2020 129 620.7; dated Nov. 9, 2022.

\* cited by examiner

INDEXING GEAR MECHANICAL STOP

CROSS-REFERENCE TO RELATED APPLICATION

This U.S. Patent Application claims the benefit of and priority to U.S. Provisional Patent Application Ser. No. 62/934,359 filed on Nov. 12, 2019, and titled "Indexing Gear Mechanical Stop," the entire disclosure of which is hereby incorporated by reference.

TECHNICAL FIELD

The present disclosure relates to a steer-by-wire (SbW) hand-wheel actuator (HWA) having a mechanical stop.

BACKGROUND OF THE INVENTION

As technology advances in the automobile industry, direct mechanical linkages between the steering wheel and tires may be replaced with a HWA and road-wheel actuator (RWA), which are not directly connected by a mechanical linkage. During travel of the automobile, the HWA and RWA cooperate with one another, through electrical communication (e.g., wires, sensors, and a central processing unit), to directionally control travel of the automobile. More specifically, sensed movement of the respective hand-wheel and/or tires is electrically communicated to the respective HWA or RWA to cause movement of the hand-wheel and/or tires. However, such advancement in automobile technology, and the complexity in the same, present unique challenges. For example, a hand-wheel coupled to a HWA is typically free to rotate. In other words, the hand-wheel, with the hand-wheel shaft, may rotate any number of rotations, and in any direction. However, too much rotation of the hand-wheel may result in damage to certain components, such as a clock spring, among other issues.

The problems discussed above were not present in automobiles with the direct mechanical linkages between the hand-wheel and tires. The direct mechanical linkage between the hand-wheel and the tires limited the rotation of the hand-wheel when the tires were turned to a maximum angle. Specifically, the mechanical linkage provided a "hard stop" to the rotation of the hand-wheel when the tires were turned to a maximum angle.

SUMMARY OF THE INVENTION

According to one aspect of the disclosure, a hand-wheel actuator assembly for preventing over rotation of a provided hand-wheel shaft is provided. The hand-wheel actuator assembly comprises a housing that defines an opening surrounding an axis for receiving the provided hand-wheel shaft. A drive gear with at least one drive tooth is at least partially received in the opening. The drive gear is configured for connection to and rotation with the provided hand-wheel shaft about the axis. A stop gear is coupled to the housing and includes at least one stop gear tooth for engagement with the at least one drive gear tooth and preventing rotation of the drive gear over a predetermined threshold.

According to another aspect of the disclosure, a hand-wheel actuator assembly for preventing over rotation of a provided hand-wheel shaft is provided. The hand-wheel actuator assembly comprises a housing defining an opening surrounding an axis for receiving the provided hand-wheel shaft. A drive gear is at least partially disposed in the opening for connection to and rotation with the provided hand-wheel shaft. The drive gear includes a drive gear tooth. A stop gear is pivotably coupled at a pivot point to the housing and includes three stop gear teeth separated by two stop gear tooth voids for meshed engagement with the drive gear tooth and for preventing rotation of the drive gear over a predetermined threshold.

According to yet another aspect of the disclosure, a hand-wheel actuator assembly is provided. The hand-wheel actuator assembly comprises a housing defining an opening surrounding an axis. A hand-wheel shaft extends along the axis between a hand-wheel and an end. A drive gear is rotationally coupled to the hand-wheel shaft and is at least partially disposed in the opening. The drive gear includes at least one drive gear tooth. A stop gear is coupled to the housing and includes at least one stop gear tooth for engagement with the at least one drive gear tooth for preventing rotation of the drive gear over a predetermined threshold.

These and other advantages and features will become more apparent from the following description taken in conjunction with the drawings

DETAILED DESCRIPTION

Figure 1:
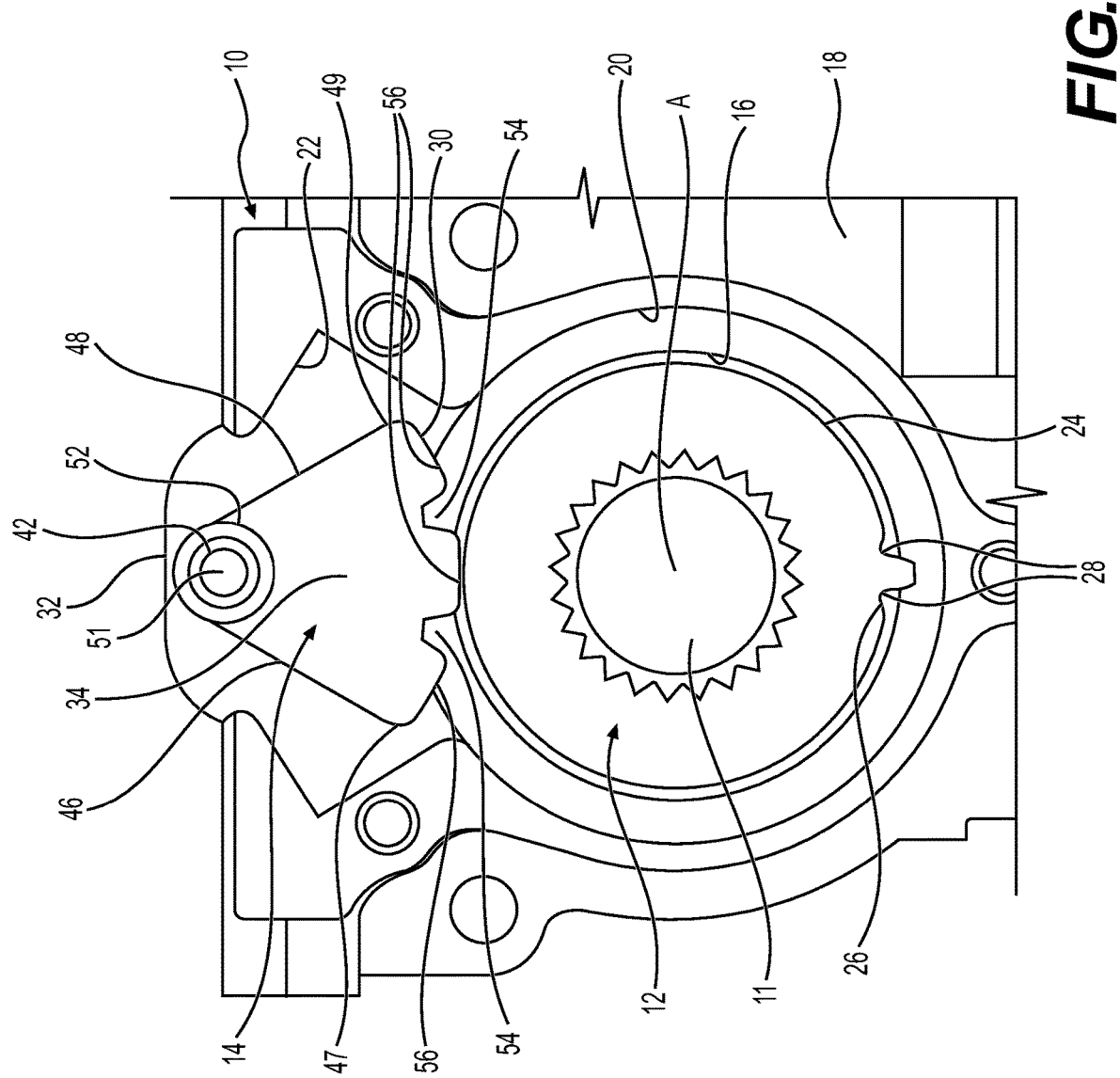
FIG. 1 is a sectional view of the HWA illustrating the housing, drive gear, and stop gear.

Referring now to the drawings, where the various embodiments are shown and described herein, without limiting same, FIGS. 1-7 illustrate a hand-wheel actuator (HWA) (not numbered) that allows more than 360 degrees of rotation of a hand-wheel and a "hard stop" for the hand-wheel. The HWA of the present disclosure is cost effective, easy to package, minimizes NVH, has minimal to no friction between rotating parts, and is easy to assemble.

With reference to FIG. 1, the portion of the HWA is illustrated to show the housing 10, drive gear 12, and stop gear 14 of the HWA. The housing 10 defines a cylindrical opening 16 coaxial with an axis A. A hand-wheel shaft 11 is partially disposed in the opening 16, and positioned coaxially with axis A. The hand-wheel shaft 11 includes ends, and the drive gear 12 is rotationally coupled to an end of the hand-wheel shaft 11 and partially disposed in the opening 16, and a hand-wheel (not shown) is coupled to the other end of the hand-wheel shaft. The drive gear 12 is rotatable with the hand-wheel shaft 11 and the hand-wheel via a splined engagement. More specifically, rotation of the hand-wheel causes direct, and equivalent, rotation of the hand-wheel shaft 11 and the drive gear 12. Although the drive gear 12 is discussed herein as being coupled to the end of the hand-wheel shaft 11, it is to be appreciated that the drive gear 12 may be integral with, or part of, the hand-wheel shaft 11. The housing 10 further has a side 18 which defines a first recess 20 and a stop gear recess 22. The first recess 20 extends partially about the opening 16 and into the stop gear recess 22. The stop gear 14 pivotably couples to the housing 10, and is disposed in the stop gear recess 22.

The drive gear 12 further has an outer periphery 24, and a drive tooth 26 extends radially from the outer periphery 24 to be partially disposed within the recess 20. The outer periphery 24 may define a pair of drive teeth recesses 28 (see also FIG. 5) disposed adjacent each side of the drive tooth 26. When the hand-wheel causes the drive gear 12 to rotate, the drive tooth 26 is configured to engage, and drive teeth recesses 28 are configured to cooperate with, the stop gear 14 to provide a "hard stop," or limit, rotation of the hand-wheel beyond predetermined rotational thresholds. One or more components described herein may be adjusted to customize the predetermined rotational threshold, which can be any desired rotational limit of the hand wheel.

The stop gear 14 is a substantially cone-shaped or flat, semi-triangular component. The stop gear 14 has an arcuate side 30, a first side 46 and a second side 48, and an attachment end 32. The stop gear 14 further has an upper surface 34 (see FIG. 1) and a lower surface 36 (see FIG. 4), and a spherical boss 38 is disposed centrally, and adjacent the arcuate side 30 on the lower surface 36. The attachment end 32 defines a cylindrical void 40 for receiving a bolt 42, where the bolt 42 pivotably couples the stop gear 14 to the housing 10. In the illustrated embodiment, three stop teeth 56 are defined in the arcuate side 30 by two stop teeth voids 54. Depending on design specifications of the HWA, an alternative number of stop teeth 56, or stop teeth voids 54, may be defined in the arcuate side 30. The first side 46 and the second side 48 may define a body angle equal to or less than 120°, for example, 90° or less, or 60° or less. Centers of the two teeth voids 54 may define a tooth angle that extends from a center of the cylindrical void 40 (or pivot point) at a value equal to or less than 90°, for example, 60° or less, or 30° or less. In one arrangement, the body angle is 60° and the tooth angle is 30°. As such, the gear stop recess 22 may include abutment surfaces 41, 43 that abut the first side 46 and the second side 48, respectively. The abutment surfaces 41, 43 may define a stop recess angle from the center of the cylindrical void 40 (or pivot point) at a value more than, equal to, or less than the body angle plus the tooth angle. In one arrangement, the stop recess angle is substantially equal to (e.g., within 10°) the body angle plus the tooth angle. The first side 46 defines a first taper 47 adjacent to one of the stop teeth 56 and the second side 48 defines a second taper 49 adjacent to one of the stop teeth 56 (see FIG. 1). The tapers 47, 49 define a taper angle that is different than the body angle and may be less than the body angle such that the first taper 47 and the second taper 49 abut drive tooth 26 in a relatively parallel relationship (see FIG. 7) when in the full turn positions (see FIG. 2).

When the hand-wheel rotates beyond the predetermined rotation threshold, the drive tooth 26 and the drive teeth recesses 28 engage and cooperate with the stop teeth 56, and stop teeth voids 54 to stop, or limit, rotation of the hand-wheel. Specifically, the drive tooth 26 rotates into one of the stop teeth voids 54 and engages one of the stop teeth 56, to engage and cause the stop gear 14 to pivot. To avoid undesired contact between stop teeth 56 and the drive gear 12, the drive teeth recesses 28 receives one of the stop teeth 56. The drive teeth recesses 28 provides an uninterrupted or smooth engagement between the drive tooth 26 and one of the stop teeth 56.

The gears 12, 14, and the elements thereof, are configured to withstand torques of approximately 100 Nm to 250 Nm. The gears 12, 14 may also be configured to withstand torques equal to, or less than, 100 Nm, or equal to, or greater than, 250 Nm. Non-limiting factors for determining the torque limits of the gears 12, 14 may be determined by the material, size, thickness, and shape of the gears 12, 14. For example, the thicker the gear 12, 14 is made, or the elements thereof, the larger the torque or forces it may absorb without breaking or fatiguing. Further, mechanical or physical properties of materials varies widely, and the desired mechanical or physical characteristics of the gears 12, 14 may be achieved by selecting a material with the desired mechanical or physical characteristics.

Figure 2:
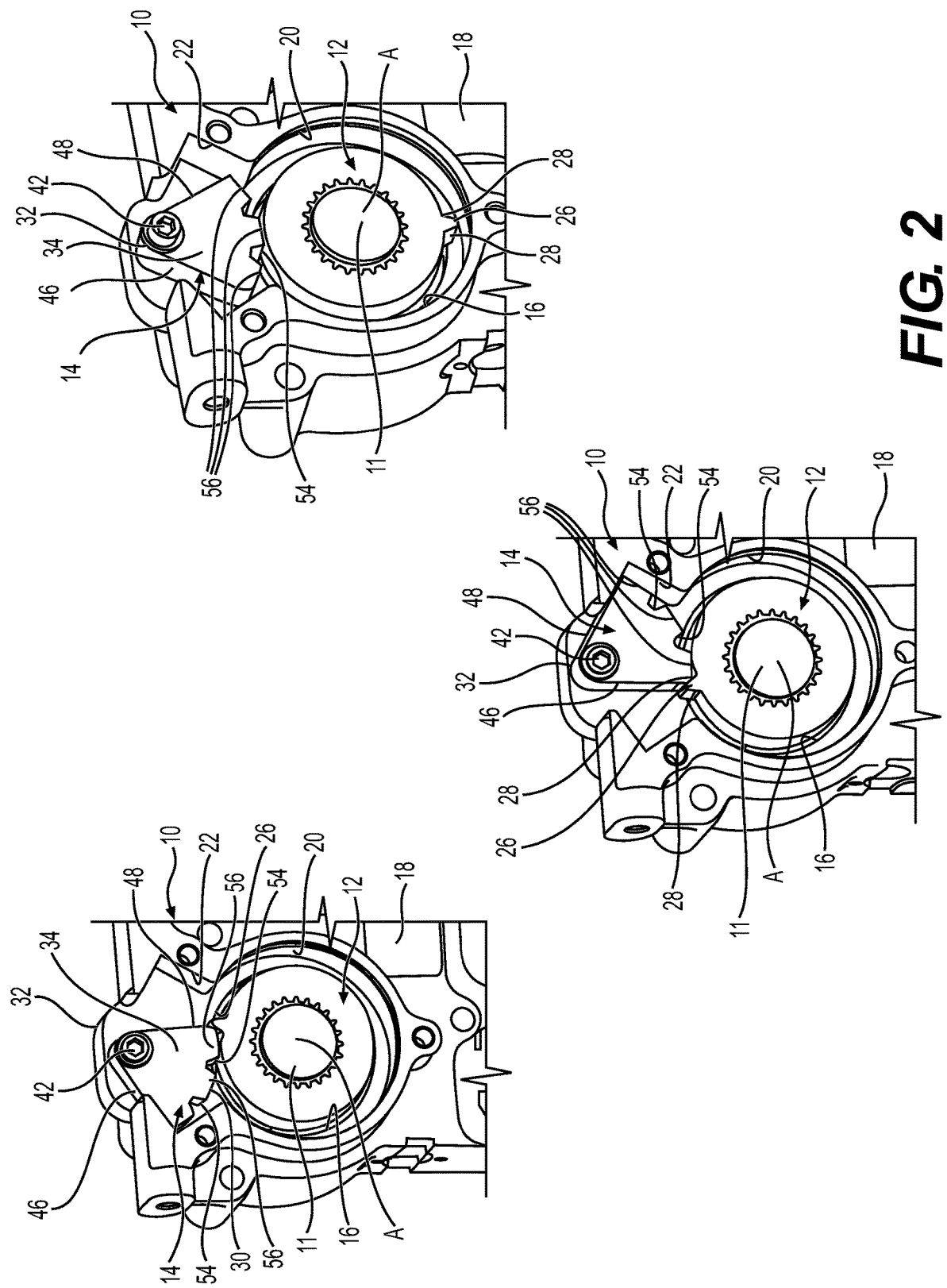
FIG. 2 illustrates three sectional views of the HWA showing the drive gear and the stop gear in a full right turn position, a center position and a full left turn position.
Figure 3:
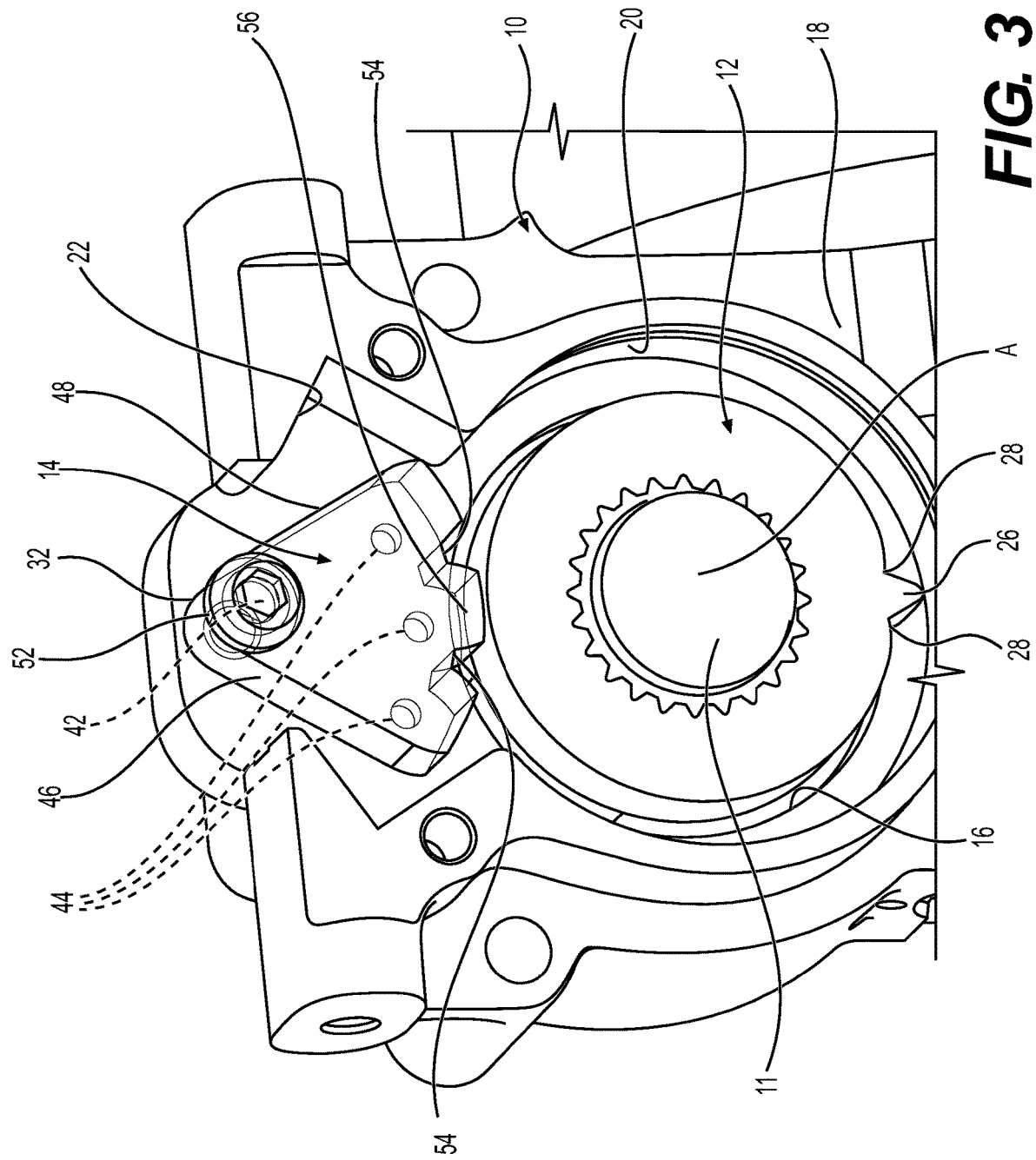
FIG. 3 is a sectional view of the HWA illustrating the housing, drive gear, and stop gear, where the stop gear is shown in phantom to illustrate a wave spring which prevents undesired pivot movement of the stop gear.

With reference to FIG. 2, the stop gear 14 may pivot between a full right turn position, an on center position, and a full left turn position. In the on center position, the stop gear 14 is centrally positioned in the stop gear recess 22, and does not engage or cooperate with the drive gear 12 to allow free rotation of the hand wheel. In the on center position, as the hand-wheel rotates, the drive tooth 26 freely rotates within the recess 20. As the hand-wheel rotates towards a predetermined rotational threshold, the drive tooth 26 enters the stop gear recess 22, and engages a stop tooth 56 to pivot the stop gear 14. Depending on the direction of rotation of the hand-wheel, drive gear 12 pivots the stop gear 14 into the full right turn position or the full left turn position upon sufficient rotation. In the respective full right or left turn positions, the respective first or second side 46, 48 of the stop gear 14 abuts and engages respective abutment surfaces 41, 43 of the housing 10 to limit, or stop, rotation of the hand wheel beyond the predetermined rotational threshold in one direction. If the hand-wheel is rotated in the opposite direction, the drive gear 12 disengages the stop gear 14 and is free to rotate without engagement of the stop gear 14.

Figure 4:
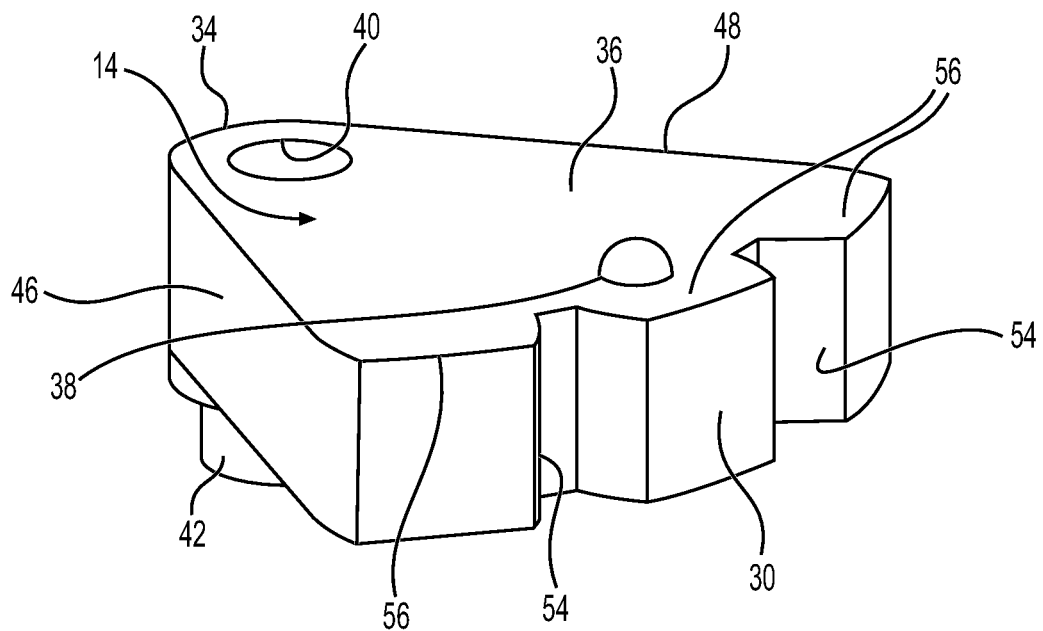
FIG. 4 is a partial sectional view of the HWA illustrating the housing, and the drive gear, and the stop gear removed from the HWA to show holes of the housing and a boss of the stop gear that engages the holes.
Figure 4:
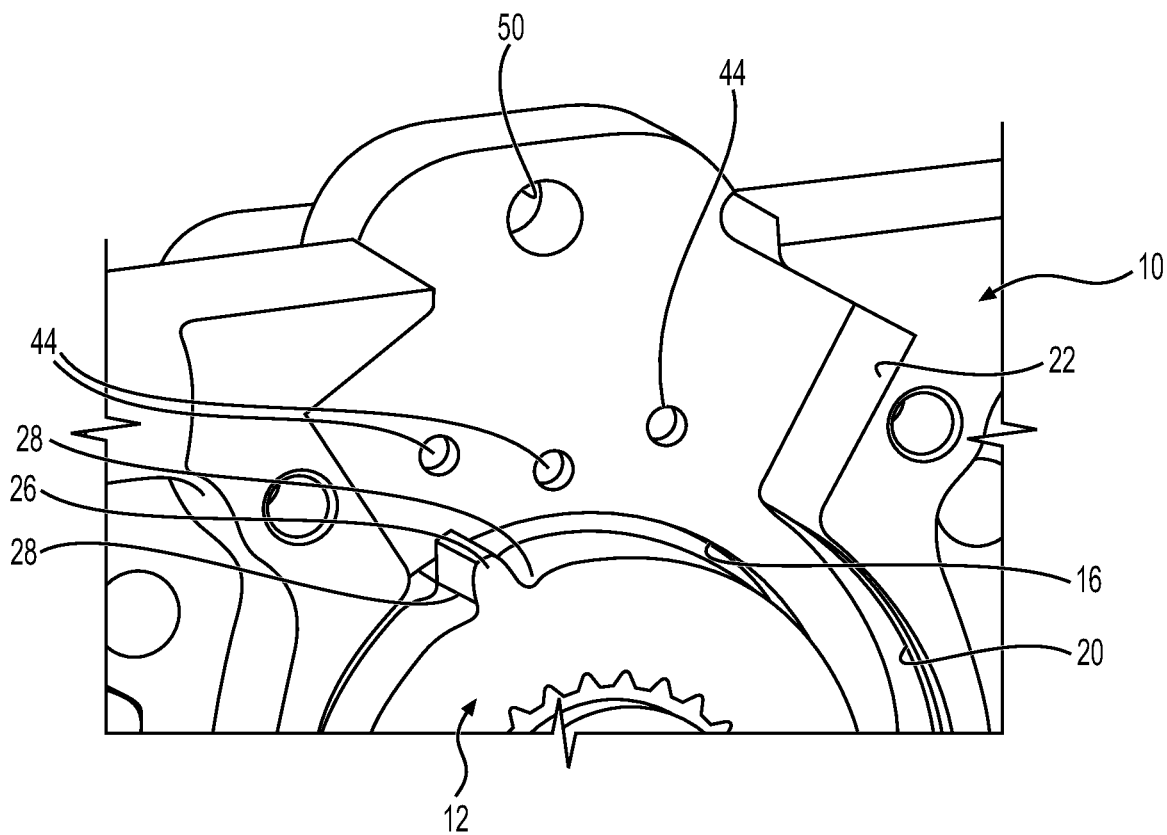

With reference to FIG. 4, the housing 10 further defines a plurality of three holes 44 or recesses disposed in a wall of the housing that partially defines the stop gear recess 22. The plurality of three holes 44 are spaced equidistant from one another and fall within an arcuate pattern to mirror the arcuate end 32 of the stop gear 14. Further, the plurality of three holes 44 are configured to receive and engage the boss 38 of the stop gear 14 when the stop gear is in each of the full right turn, on center, and full left turn positions. Although three holes 44 are illustrated and described, it is to be appreciated less, or more than, three holes 44 may be provided in other embodiments. In one arrangement, the spacing of the holes 44 and the center of the cylindrical void 40 define setting angles that are equal to the tooth angle. The number of holes 44 may vary based on design variations of the HWA.

The housing 10 further defines a bolt recess 50 (see FIG. 4) for receiving the bolt 42 through the cylindrical void 40. The bolt recess 50 and the bolt 42 may both include cooperating threads for securing connection therebetween. The bolt 42 may include a bolt head 51 for securing the stop gear 14 thereto. A spring 52, (see FIG. 3), such as a wave spring, may be located between the bolt head 51 and the stop gear 14 to bias the stop gear 14 towards the housing 10. The engagement between the wave spring 52 and the bolt 42 may prevent undesired pivoting of the stop gear 14. Specifically, the wave spring 52 engages and cooperates with the bolt 42 to pull and/or push the stop gear 14 towards the housing 10.

The wave spring 52 is configured to provide a force on the stop gear 14 to maintain the boss 38 in a respective hole 44 in each of the full right turn, on center, and full left turn positions. However, when the drive gear 12 engages the stop gear 14, the force is overcome, and the boss 38 disengages the respective hole 44. Further, the stop gear 14 moves away from the housing 10, allowing the disengagement between the boss 38 and the respective hole 44, and pivot of the stop gear 14 towards, and to another, one of the respective full right turn, on center, and full left turn positions.

Figure 5:
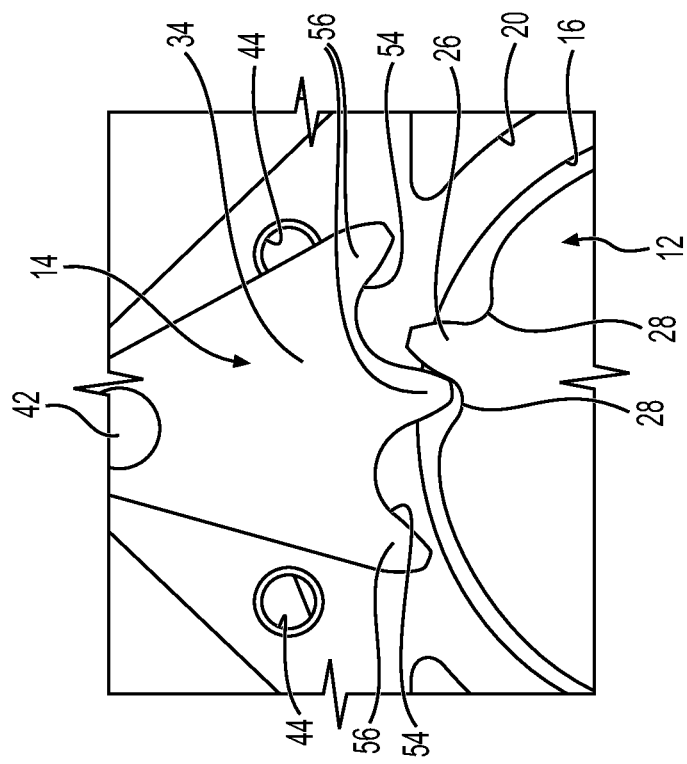
FIG. 5 illustrates two sectional views of the HWA showing the drive gear interacting with the stop gear.
Figure 5:
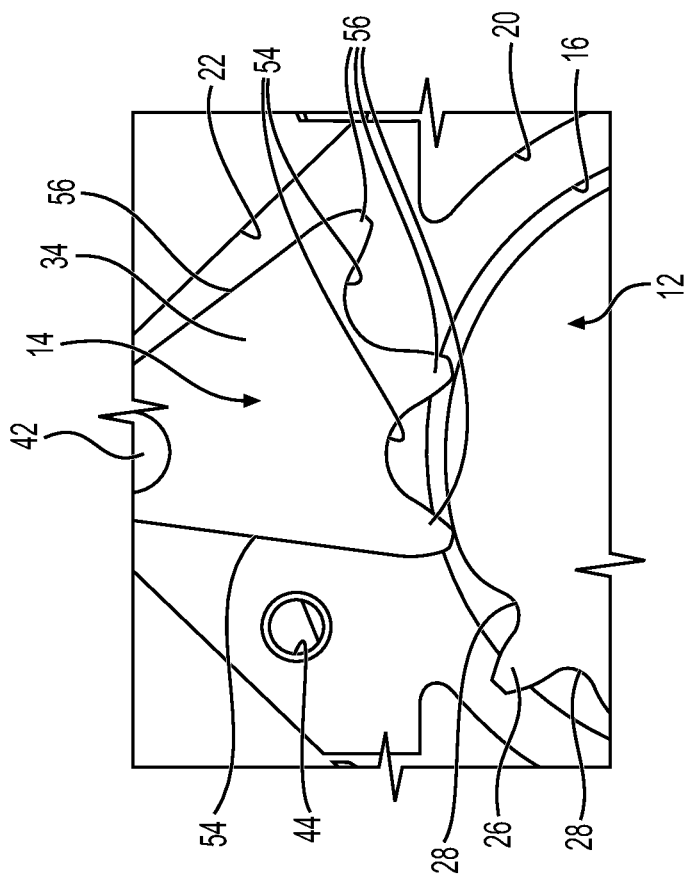

FIG. 5 illustrates the HWA wherein the stop gear 14 and the drive gear 12 provide a slightly modified shape that includes rounded teeth voids 54, rounded stop teeth 56, and a rounded drive tooth 26. The rounded teeth voids 54, the rounded stop teeth 56, and the rounded drive tooth 26 prevent unintended indexing of the stop gear 14. More particularly, the rounded stop teeth 56 cannot move due to the close proximity to the drive gear 12. Only when the rounded drive tooth 26 rotates into contact does the stop gear 14 index. It should be appreciated that the size, shape, and number of teeth can vary without departing from the scope of the subject disclosure.

Figure 6:
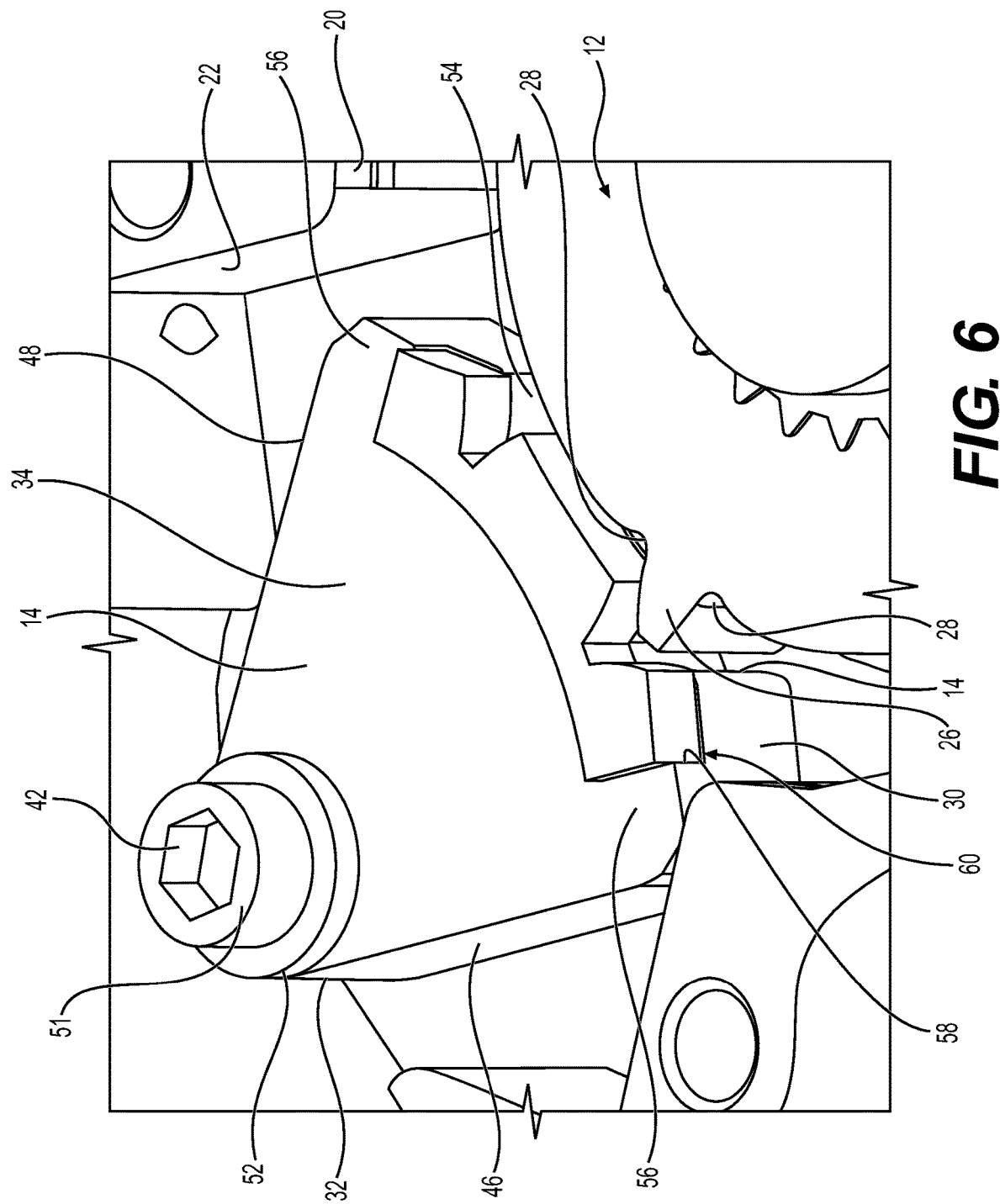
FIG. 6 is a partial sectional view of the HWA illustrating the housing, drive gear, stop gear, and an elastomeric member coupled to the stop gear.

With reference to FIG. 6, an elastomer recess 58 may be defined by the arcuate side 30 of the stop gear 14. The elastomer recess 58 may further be defined as being at least partially defined by one or more of the stop teeth 56. An elastomer insert 60 is disposed in the elastomer recess 58, to dampen NVH when the drive gear 12 engages the stop gear 14.

Figure 7:
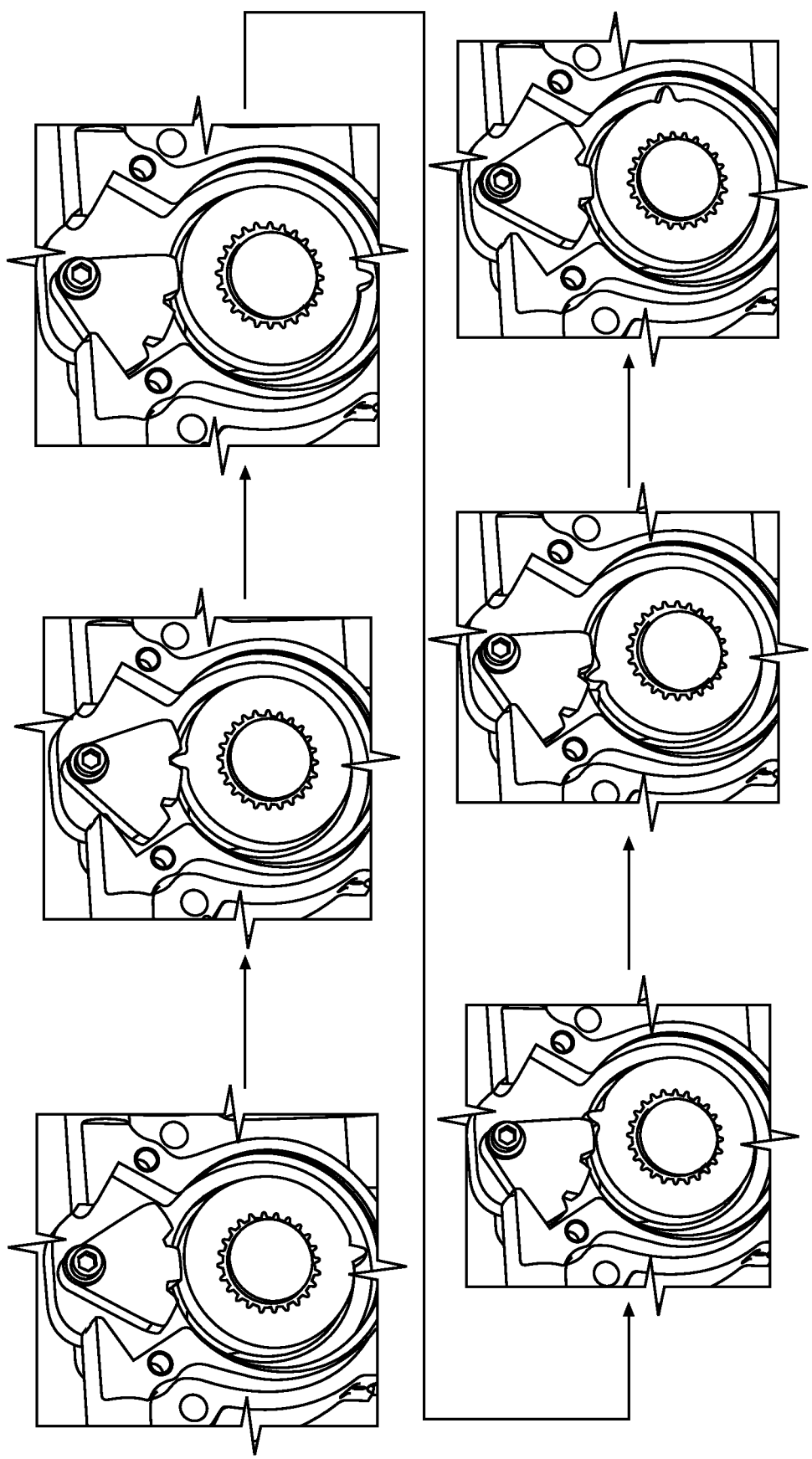
FIG. 7 illustrates a series of sectional views of the HWA in operation showing the HWA being serially rotated via a hand-wheel.

Operation of the HWA is shown in FIG. 7 wherein a series of drawings from left to right illustrate the hand wheel initially turned left a maximum number of rotations before then being turned right. More particularly, the drive tooth 26 enters one of the teeth voids 54 and pivots the stop gear 14 until one of the first side 46 and the second side 48 abut one of the respective abutment surfaces 41, 43 and the boss 38 enters one of the holes 44 associated with full left or full right turn. The boss 38 is then retained in the associated hole 44 allowing the hand wheel to continue to rotate in the same direction an additional 360° before abutting the first or second taper 47, 49 of the stop gear 14 in a substantially parallel relationship whereat the hand wheel can only be rotated in the opposite direction. When rotated in the opposite direction, the first full rotation resets the boss 38 into the center position and the second full rotation in the opposite direction places the boss 38 in the opposite full left or full right turn position.

The present disclosure provides a HWA that is cost effective, easy to package, minimizes NVH, minimal to no friction between rotating parts, and is easy to assembly, and provides for more than 360 degrees of rotation of a hand-wheel, with a "hard stop." Further the HWA of the present disclosure is designed to handle high torques (ranging from approximately 100 Nm to 250 Nm).

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Upon review of the disclosure, many other embodiments may be apparent to those skilled in the art. Moreover, other embodiments may be used and derived from the disclosure, such that a structural substitution, logical substitution, or another change may be made without departing from the scope of the disclosure. Accordingly, the disclosure is to be regarded as illustrative rather than restrictive.

Certain features, for clarity, described herein in the context of separate embodiments, may also be provided in combination in a single embodiment. Conversely, various features that are, for brevity, described in the context of a single embodiment, may also be provided separately or in any subcombination. Further, references to values are to be regarded as non-limiting examples.

Having thus described the invention, it is claimed:

1. A hand-wheel actuator assembly for preventing over rotation of a provided hand-wheel shaft comprising:
   a housing defining an opening surrounding an axis for receiving the provided hand-wheel shaft;
   a drive gear for connection to, and rotation with, the provided hand-wheel shaft about the axis, wherein the drive gear is at least partially disposed in the opening and includes at least one drive gear tooth; and
   a stop gear coupled to the housing and including at least one stop gear tooth for engagement with the at least one drive gear tooth and preventing rotation of the drive gear over a predetermined threshold, wherein the stop gear is connected to the housing at a pivot point and is pivotable between an on center position, a full left turn position, and a full right turn position when the at least one drive gear tooth rotates into contact and pushes the at least one stop gear tooth, wherein a rotation in the right direction of the drive gear pivots the stop gear from the on center position to the full right turn position, wherein the at least one stop gear tooth is pivoted out of engagement with the at least one drive gear tooth in the full right position and the drive gear is permitted to continue the right rotation past the stop gear.

2. The hand-wheel actuator assembly of claim 1, wherein the drive gear is permitted to continue to rotate in the right direction until the at least one drive gear tooth abuts a surface of the stop gear and is prevented from further rotation in the right direction, whereafter a left rotation in the left direction of the drive gear is permitted and resets the stop gear in the center position upon engagement between the a least one drive gear tooth and the at least one stop gear tooth in the left direction.

3. A hand-wheel actuator assembly for preventing over rotation of a provided hand-wheel shaft comprising:
   a housing defining an opening surrounding an axis for receiving the provided hand-wheel shaft;
   a drive gear for connection to, and rotation with, the provided hand-wheel shaft about the axis, wherein the drive gear is at least partially disposed in the opening and includes at least one drive gear tooth; and
   a stop gear coupled to the housing and including at least one stop gear tooth for engagement with the at least one drive gear tooth and preventing rotation of the drive gear over a predetermined threshold, wherein the stop gear is connected to the housing at a pivot point and is pivotable between an on center position, a full left turn position, and a full right turn position when the at least one drive gear tooth rotates into contact and pushes the at least one stop gear tooth, wherein the stop gear includes a lower surface facing the housing, wherein the lower surface defines one of a boss or a plurality of boss receiving holes and the housing includes the other one of the boss or the plurality of boss receiving holes.

4. The hand-wheel actuator assembly of claim 3, wherein the plurality of boss receiving holes includes a first boss receiving hole that receives the boss in the full right turn positon, a second boss receiving hole that receives the boss in the on center positon, and a third boss receiving hole that receives the boss in the full left turn positon.

5. The hand-wheel actuator assembly of claim 4, wherein a spring biases the stop gear towards the housing.

6. The hand-wheel actuator assembly of claim 5, wherein a bolt pivotably connects the stop gear to the housing along the pivot point and wherein the spring is located adjacent to the pivot point.

7. The hand-wheel actuator assembly of claim 1, wherein the drive gear defines a recess on either side of the at least one drive tooth for accommodating the at least one stop tooth.

8. A hand-wheel actuator assembly for preventing over rotation of a provided hand-wheel shaft comprising:
   a housing defining an opening surrounding an axis for receiving the provided hand-wheel shaft;
   a drive gear for connection to, and rotation with, the provided hand-wheel shaft, wherein the drive gear is at least partially disposed in the opening and includes a drive gear tooth; and
   a stop gear pivotably coupled at a pivot point to the housing and including three stop gear teeth separated by two stop gear tooth voids for meshed engagement with the drive gear tooth and preventing rotation of the drive gear over a predetermined threshold, wherein the housing includes a stop gear recess and the stop gear is at least partially located within the stop gear recess, wherein the stop gear recess is defined between a first abutment surface limiting the pivotal movement of the stop gear in a first direction and a second abutment surface limiting the pivotal movement of the stop gear in a second direction, wherein the stop gear defines a first side for abutment with the first abutment surface and a second side for abutment with the second abutment surface, wherein the first side and second side define a body angle, wherein the first abutment surface and the second abutment surface define a recess angle that is larger than the body angle, wherein a tooth angle is defined centrally through each of the stop gear tooth voids and the pivot point and wherein the recess angle is substantially equal to the body angle plus the tooth angle.

9. The hand-wheel actuator assembly of claim 8, wherein the recess angle is equal to the body angle plus the tooth angle.

10. A hand-wheel actuator assembly comprising:
    a housing defining an opening surrounding an axis;
    a hand-wheel shaft extending along the axis between a hand-wheel and an end;
    a drive gear rotationally coupled to the hand-wheel shaft, wherein the drive gear is at least partially disposed in the opening and includes at least one drive gear tooth; and
    a stop gear coupled to the housing and including at least one stop gear tooth for engagement with the at least one drive gear tooth and preventing rotation of the drive gear over a predetermined threshold, wherein the drive gear includes a splined inner surface and the hand-wheel shaft includes a splined outer surface engaged with the splined inner surface, wherein the stop gear is connected to the housing at a pivot point and is pivotable between an on center position, a full left turn position, and a full right turn position, wherein the stop gear includes a lower surface facing the housing, wherein the lower surface defines a boss and the housing includes a plurality of boss receiving holes, wherein the plurality of boss receiving holes includes a first boss receiving hole that receives and retains the boss in the full right turn positon, a second boss receiving hole that receives and retains the boss in the on center positon, and a third boss receiving hole that receives and retains the boss in the full left turn positon.

11. The hand-wheel actuator assembly of claim 10, wherein the first boss receiving hole, the second boss receiving hole, and the third boss receiving hole are each located along an arc.

\* \* \* \* \*